US009484164B2

United States Patent
Bartonek et al.

(10) Patent No.: US 9,484,164 B2
(45) Date of Patent: Nov. 1, 2016

(54) CRASHWORTHY MEMORY MODULE HAVING A THERMAL CUTOFF

(71) Applicant: Progress Rail Services Corporation, Albertville, AL (US)

(72) Inventors: Mark Joseph Bartonek, Independence, MO (US); Todd Charles Goergen, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 169 days.

(21) Appl. No.: 14/331,903

(22) Filed: Jul. 15, 2014

(65) Prior Publication Data

US 2016/0020598 A1 Jan. 21, 2016

(51) Int. Cl.
*H02H 5/04* (2006.01)
*H01H 11/00* (2006.01)
*G06F 1/16* (2006.01)
*B64D 45/00* (2006.01)

(52) U.S. Cl.
CPC .............. *H01H 11/00* (2013.01); *G06F 1/16* (2013.01); *B64D 2045/009* (2013.01); *B64D 2045/0065* (2013.01)

(58) Field of Classification Search
CPC .................................. H02H 5/04; H01H 11/00
USPC ........................................................ 361/104
See application file for complete search history.

(56) References Cited

U.S. PATENT DOCUMENTS

| 4,189,697 | A | * | 2/1980 | Hara .................... H01H 37/765 337/407 |
| 4,837,547 | A | | 6/1989 | Nixon et al. |
| 5,845,272 | A | | 12/1998 | Morjaria et al. |
| 6,924,027 | B2 | * | 8/2005 | Matayabas, Jr. .... H01L 23/3737 428/323 |
| 7,206,505 | B2 | | 4/2007 | Gasper |
| 7,703,291 | B2 | | 4/2010 | Bushnik et al. |
| 2005/0286225 | A1 | * | 12/2005 | Moore et al. ........... G06F 1/182 361/695 |
| 2011/0019355 | A1 | * | 1/2011 | Cleveland .......... G11B 33/1406 361/679.31 |
| 2013/0162387 | A1 | | 6/2013 | Kelley |

OTHER PUBLICATIONS

U.S. Patent Application of Mark Joseph Bartonek, entitled "Crashworthy Memory Module Having a Thermal Wiring Disconnect System" filed on Jul. 15, 2014.
U.S. Patent Application of Mark Joseph Bartonek et al., entitled "Crashworthy Memory Module Having a Crack Repair System" filed on Jul. 15, 2014.

* cited by examiner

*Primary Examiner* — Thienvu Tran
*Assistant Examiner* — Kevin J Comber
(74) *Attorney, Agent, or Firm* — Finnegan, Henderson, Farabow, Garrett & Dunner, LLP

(57) ABSTRACT

A memory module is disclosed. The memory module may have an enclosure having a slot in a wall of the enclosure. The memory module may also have a device disposed within the enclosure. The memory module may further have a thermal cutoff disposed in the slot. The thermal cutoff may have a first end attached to the device. The thermal cutoff may also have a second end attached to a wire configured to electrically connect to the device. The thermal cutoff may disconnect the wire from the device when subjected to a threshold temperature.

18 Claims, 5 Drawing Sheets

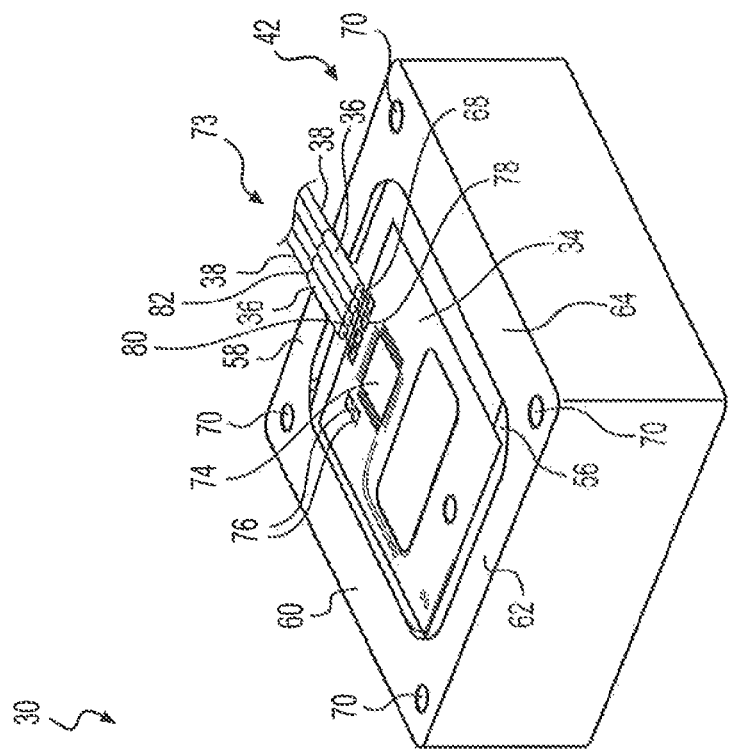
FIG. 3
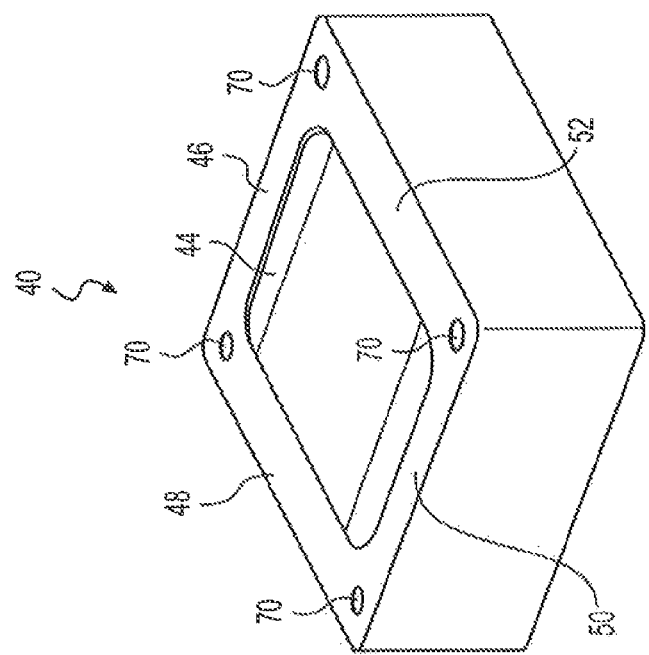

US 9,484,164 B2

CRASHWORTHY MEMORY MODULE HAVING A THERMAL CUTOFF

TECHNICAL FIELD

The present disclosure relates generally to a crashworthy memory module and, more particularly, to a crashworthy memory module having a thermal cutoff.

BACKGROUND

Modern locomotives typically include one or more crashworthy memory modules or "black boxes" that record and communicate information including voice and image data and vehicle performance parameters received from event recorders or locomotive control computers. Data retrieved from a crashworthy memory module after an accident involving a locomotive can help reconstruct and provide a detailed and accurate accounting of events leading up to and during the accident. Crashworthy memory modules, therefore, store the recorded information in a crash-hardened memory unit designed and built to withstand the severe conditions that may occur during the accident.

An accident involving a locomotive may include fires caused due to spillage of fuel from the locomotive or from railroad cars attached to or located near the accident scene. A crashworthy memory module may be subjected to temperatures as high as 1400° F. because of such fires. Crashworthy memory modules are designed to withstand such high temperatures and smolder temperature as high as 500° F. for 10 hours or more without allowing the high temperatures to adversely affect electronic data stored within the crashworthy memory module. Although the crashworthy memory module and electronic components within the crashworthy memory module are heavily insulated, heat may still enter the crashworthy memory module through electrical wires connecting the electronic components within the crashworthy memory module to locomotive subsystems located outside the crashworthy memory module. To prevent damage to the electronic components that store data within the crashworthy memory module, it is important to prevent the heat from the fire from being conducted by the wires to the electronic components in the crashworthy memory module.

One attempt to address some of the problems described above is disclosed in U.S. Pat. No. 7,703,291 of Bushnik et al. that issued on Apr. 27, 2010 ("the '291 patent"). In particular, the '291 patent discloses an environmental control system for a hard drive of an event recorder. The disclosed thermoelectric module transfers heat between the hard drive and a housing of the event recorder, in response to an applied voltage, in order to maintain a hard drive temperature within a hard drive operable temperature range. The '291 patent also discloses an active thermoelectric controller for actively drawing heat away from the hard drive and out of the housing. The thermoelectric controller can include a heat sink coupled to the thermoelectric module and to the housing for dissipating heat from the thermoelectric module to the housing.

Although the '291 patent discloses a system for controlling the temperature of a hard drive of an event recorder, the disclosed system may still be inadequate. For example, the system of the '291 patent requires an applied voltage to control the hard drive temperature. After an accident, however, equipment which provides the applied voltage may not function rendering the thermal control system of the '291 patent inadequate. Further, the system of the '291 patent may not be able to prevent heat from a fire outside the event recorder from entering the event recorder through wires connected to the hard drive.

The crashworthy memory module of the present disclosure solves one or more of the problems set forth above and/or other problems in the art.

SUMMARY

In one aspect, the present disclosure is directed to a memory module. The memory module may include an enclosure having a slot in a wall of the enclosure. The memory module may also include a device disposed within the enclosure. The memory module may further include a thermal cutoff disposed in the slot. The thermal cutoff may include a first end attached to the device. The thermal cutoff may also include a second end attached to a wire configured to electrically connect to the device. The thermal cutoff may be configured to disconnect the wire from the device when subjected to a threshold temperature.

In another aspect, the present disclosure is directed to a thermal wiring disconnect system for a device disposed within an enclosure. The thermal wiring disconnect system may include a slot in a wall of the enclosure. The thermal wiring disconnect system may also include a thermal cutoff disposed in the slot. The thermal cutoff may include a first end attached to the device. The thermal cutoff may also include a second end attached to a wire configured to electrically connect to the device. The thermal cutoff may be configured to disconnect the wire from the device when subjected to a threshold temperature.

In yet another aspect, the present disclosure is directed to a method of manufacturing a memory module. The method may include fabricating an enclosure including a slot in a wall of the enclosure. The method may also include assembling a device in the enclosure. The method may further include assembling a thermal cutoff by disposing the thermal cutoff in the slot so that the thermal cutoff is substantially perpendicular to the wall, connecting a first end of the thermal cutoff to the device, and connecting a second end of the thermal cutoff to a wire configured to electrically connect to the device. The thermal cutoff may be configured to disconnect the wire from the device when subjected to a threshold temperature.

BRIEF DESCRIPTION OF THE DRAWINGS

FIG. 3 is another diagrammatic view of the exemplary disclosed memory module of FIG. 1;

DETAILED DESCRIPTION

Figure 1:
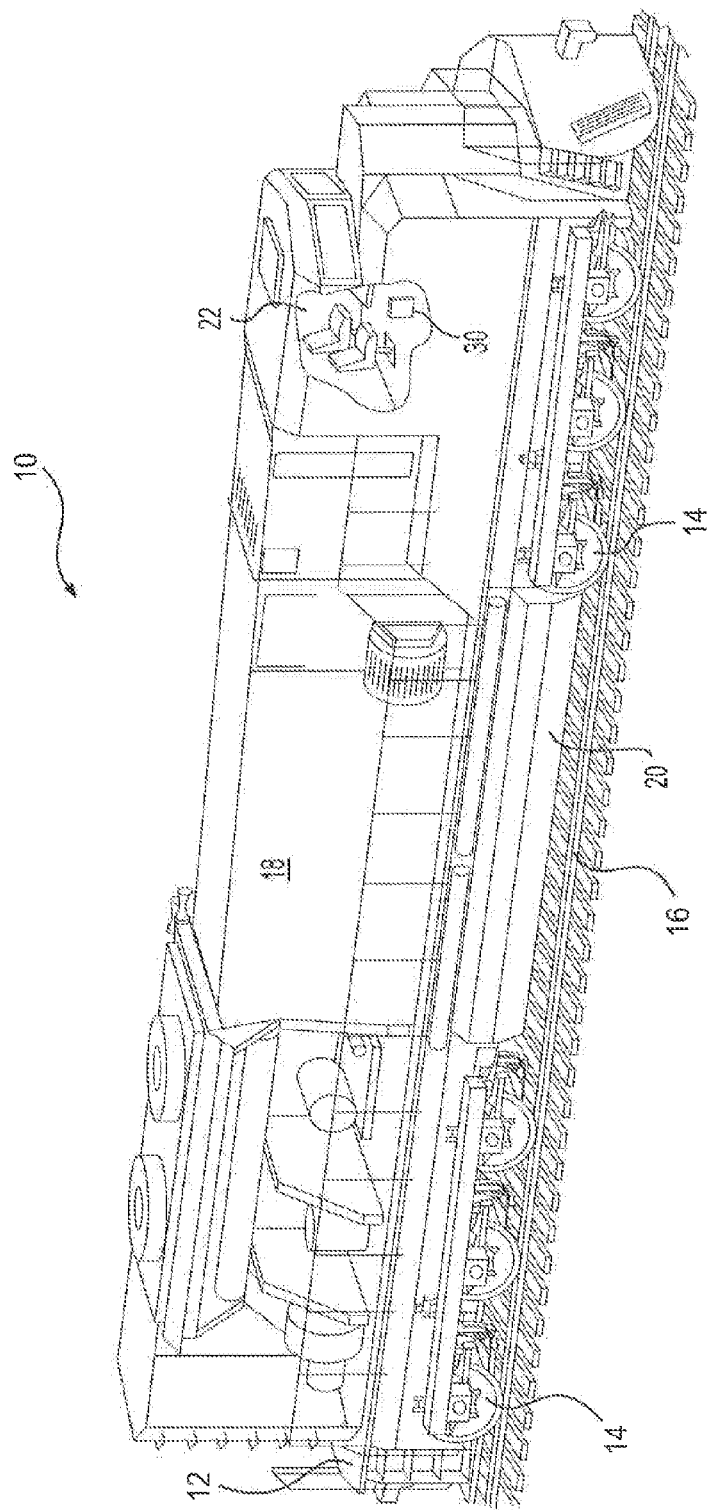
FIG. 1 is a pictorial illustration of an exemplary disclosed machine equipped with an memory module.

FIG. 1 illustrates an exemplary embodiment of a machine 10. For example, as shown in FIG. 1, machine 10 may be a locomotive designed to pull rolling stock. Machine 10 may have a platform 12 supported by a plurality of wheels 14, which may be configured to engage track 16. Wheels 14 may have traction motors (not shown) associated with them, which may drive wheels 14 to propel machine 10 in a forward or rearward direction.

Machine 10 may have an engine 18 mounted on platform 12. Engine 18 may be configured to receive fuel from fuel tank 20 and to drive one or more generators (not shown), which may generate power to drive the traction motors. Although FIG. 1 depicts one engine 18 and one fuel tank 20, it is contemplated that machine 10 may have more than one engine 18 and/or fuel tank 20. In an exemplary embodiment, as shown in FIG. 1, engine 18 may be lengthwise aligned on platform 12 along a travel direction of machine 10. One skilled in the art will recognize, however, that engine 18 may be located in tandem, transversally, or in any other orientation on platform 12. Machine 10 may also include operator cabin 22 from where an operator (not shown) may be able to control operations performed by machine 10. Although, FIG. 1 illustrates a locomotive, machine 10 may be any type of mobile machine including an automobile, an aircraft, a boat or a ship, or any other type of construction, mining, or farming machine known in the art.

Machine 10 may include one or more memory modules 30. Memory modules 30 may be crashworthy memory modules capable of surviving an accident or a crash. In one exemplary embodiment, memory module 30 may be configured to record operational parameters, input parameters, and/or a variety of data from one or more event recorders or control computers of machine 10. The various types of data may include video data and audio data, locomotive data indicative of one or more locomotive operating parameters, locomotive control signals, locomotive performance characteristics, and engine operating and performance data. Data may also include, for example, electrical data, exhaust characteristics, and positive train control data indicative of an actual location of a train, sound of a train horn, voice recording of anything spoken by the an operator, actuation of a brake lever by the operator, a signal received from a GPS sensor, a change in throttle setting, a sudden change in exhaust characteristics, the position of the train relative to a train crossing, and the speed and acceleration or deceleration of the train. As illustrated in FIG. 1, memory module 30 may be located in operator cabin 22 of machine 10. It is contemplated, however, that memory module 30 may be located anywhere on machine 10 or inside an event recorder.

Figure 2:
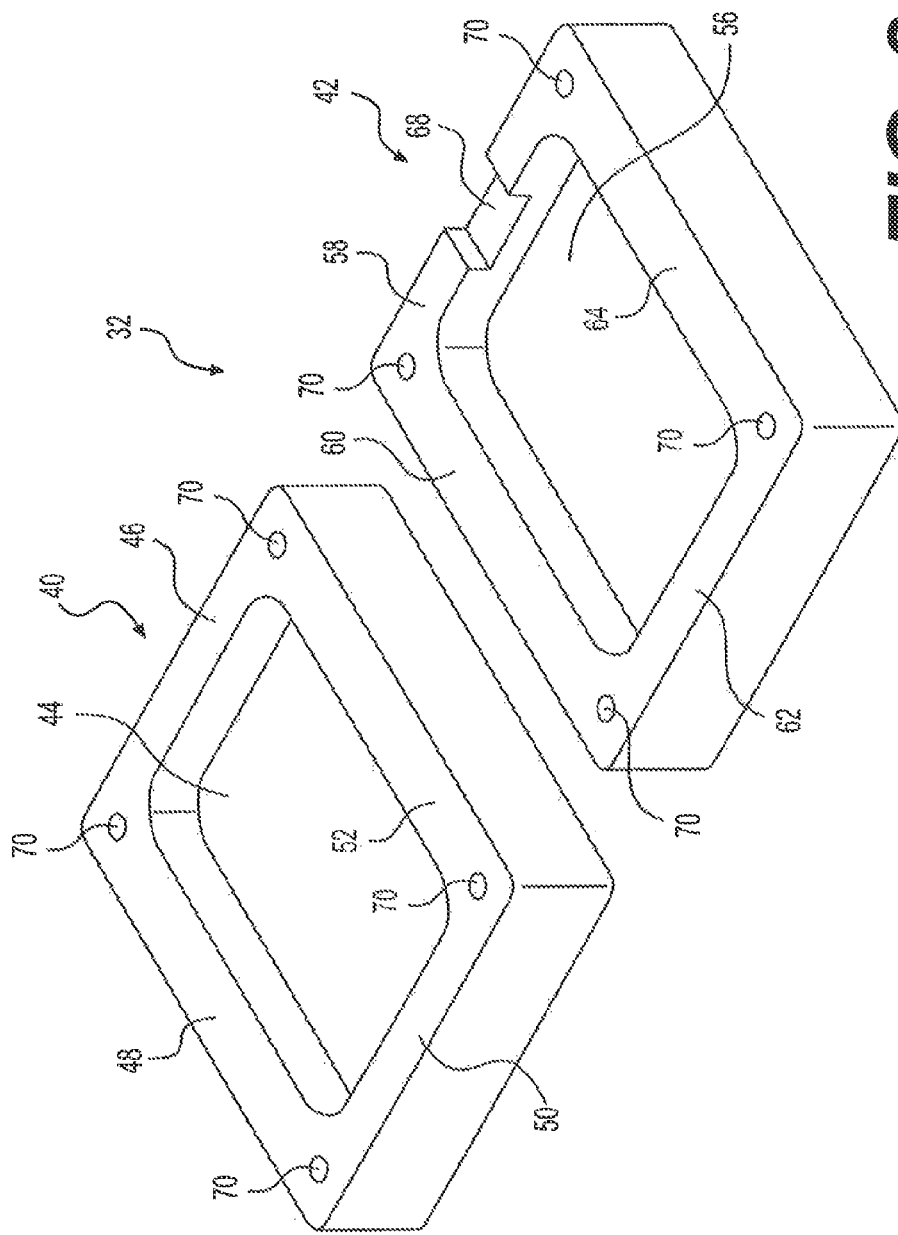
FIG. 2 is a diagrammatic view of an enclosure of the exemplary disclosed memory module of FIG. 1.

As illustrated in FIG. 2, memory module 30 may include an enclosure 32, device 34, thermal cutoffs 36, and one or more wires 38. Memory module 30 may have a rectangular or square shape. It is contemplated, however, that memory module 30 may have a circular, triangular, polygonal, or any other shape known in the art.

Enclosure 32 may include a top portion 40 and a bottom portion 42. Top portion 40 may have an upper recess 44, first side wall 46, second side wall 48, third side wall 50, fourth side wall 52, and top wall 54 (see FIG. 4). First, second, third, and fourth side walls 46, 48, 50, 52 and top wall 54 may have the same or different thicknesses. Further, the thicknesses of first, second, third, and fourth side walls 46, 48, 50, 52 and top wall 54 may be uniform or non-uniform over their respective surfaces. As illustrated in FIG. 2, bottom portion 42 may have a lower recess 56, fifth side wall 58, sixth side wall 60, seventh side wall 62, eight side wall 64, and bottom wall 66 (see FIG. 4). Fifth, sixth, seventh, and eighth side walls 58, 60, 62, 64 and bottom wall 66 may have the same of different thicknesses. Further, the thicknesses of fifth, sixth, seventh, and eighth side walls 58, 60, 62, 64 and bottom wall 66 may be uniform or non-uniform over their respective surfaces. Upper recess 44 and lower recess 56 may have a square or rectangular shape. It is contemplated, however, that upper recess 44 and lower recess 56 may have a circular, triangular, polygonal, or any other shape known in the art. In one exemplary embodiment, enclosure 32 may have a length of about 2.0 to 2.5 inches, a width of about 1.5 to 2.0 inches, and a height of about 1 inch. In another exemplary embodiment, the thickness of side walls 46, 48, 50, 52, 58, 60, 62, 64 may be about 0.325 to 0.500 inches. In yet another exemplary embodiment, the thicknesses of top wall 54 and bottom wall 66 may be about 0.225 to 0.250 inches. The terms "top," "bottom," "upper," and "lower" as used in this disclosure merely distinguish features associated with the top and bottom portions 40, 42 of memory module 30 and should not be interpreted to mean that top and bottom portions 40, 42 and/or memory module 30 are disposed in machine 10 in any particular orientation.

Bottom portion 42 may also include slot 68. As illustrated in FIG. 2, slot 68 may be disposed in side wall 58 of bottom portion 42. It is contemplated, however, that slot 68 may be disposed on any of side walls 46, 48, 50, 52, 58, 60, 62, 64, top wall 54, and/or bottom wall 66 of top and/or bottom portions 40, 42. Although FIG. 2 illustrates only one slot 68, it is contemplated that enclosure 32 may have any number of slots 68. Slot 68 may be square, rectangular, circular, elliptical, or may have any other shape known in the art. In one exemplary embodiment, slot 68 may be about 0.4 inches wide and about 0.1 inches deep.

Top portion 40 and bottom portion 42 may also include one or more holes 70 which may be used to attach top portion 40 with bottom portion 42 via, for example, nuts and bolts, screws, rivets, or any other types of connectors known in the art. Holes 70 may be circular, elliptical, slotted, square, rectangular, polygonal, or may have any other shape known in the art. Holes 70 may be through holes or may be threaded to receive one of more connectors 72 (see FIG. 4) for attaching top portion 40 with bottom portion 42. Connectors 72 may be screws, nuts, rivets, or any other type of connector known in the art. Top portion 40 and bottom portion 42 may be made of metal. It is also contemplated that top portion 40 and bottom portion 42 may be made out of materials such as ceramic, fiberglass, plastic, polymer, Bakelite, or any other insulating materials known in the art. In one exemplary embodiment, top portion 40 and bottom portion 42 may be attached to each other via for example, an adhesive, by welding, by brazing, or by any other method of bonding surfaces known in the art.

FIG. 3 illustrates another diagrammatic view of an exemplary disclosed memory module 30 having a thermal wiring disconnect system 73. As illustrated in FIG. 3, device 34 may be disposed within memory module 30. Device 34 may include a variety of electronic components designed to receive and record various types of data. In one exemplary embodiment, device 34 may include at least a controller 74, one or more storage devices 76, and one or more pads 78. Controller 74 of device 34 may embody one or more flash memory controllers, a single microprocessor or multiple microprocessors, field programmable gate arrays (FPGAs), digital signal processors (DSPs), etc. that include a means for controlling the receiving and recording of the various types of data. Numerous commercially available microprocessors can be configured to perform the functions of controller 74. Controller 74 may communicate with a general machine control system microprocessor via data links or other methods. Controller 74 may be further configured to process the data, including converting incoming data into a particular format, storing the data, and performing logical computations if necessary to determine appropriate actions.

Storage device 76 may include NOR or NAND flash memory devices, hard drives, solid state drives etc. Storage device 76 may be configured to store data or one or more instructions and/or software programs that perform functions or operations when executed by the one or more controllers 74. Although FIG. 2 illustrates only one controller 74 and only two storage devices 76, device 34 may include any number of controllers 74 and storage devices 76.

Device 34 may also include one or more pads 78. In one exemplary embodiment, pads 78 may include a copper plated region configured to facilitate attachment of wires 38 or other components. It is contemplated, however, that pads 78 may be plated with other materials, for example, silver, gold, etc. It is also contemplated that pads 78 may be square, rectangular, circular, or may have any other shape known in the art.

As further illustrated in FIG. 3, memory module 30 may include thermal cutoffs 36 disposed in slot 68. Thermal cutoffs 36 may be substantially cylindrical in shape. It is contemplated however that thermal cutoffs 36 may have a square, elliptical, rectangular, polygonal, or any other type of cross-section. Thermal cutoffs 36 may be arranged side-by-side so that a longer side of each thermal cutoff 36 is oriented substantially perpendicular to side wall 58. It is contemplated however that thermal cutoffs 36 may be disposed in slot 68 in a bunched or any other desired configuration. Thermal cutoffs 36 may include materials capable of breaking a thermally conductive path through thermal cutoff 36, when subjected to a threshold temperature so that heat flow across thermal cutoffs 36 may be minimized or eliminated. For example, thermal cutoffs 36 may allow heat, electrical current, and/or signals to pass through thermal cutoffs 36 when a temperature of the thermal cutoffs is less than a threshold temperature. When subjected to a temperature that is larger than the threshold temperature, thermal cutoffs 36 may prevent heat, electrical current, and/or signals from passing through thermal cutoffs 36. In one exemplary embodiment, the threshold temperature may range from about 230° F. to 260° F. (110° C. to 127° C.). First end 80 of thermal cutoffs 36 may be attached to pads 78 using solder material. Second end 82 of thermal cutoffs 36 may be attached to wires 38 which may be configured to transfer heat, current, and/or signals to or from device 34. It is contemplated that the solder material used for attaching first ends 80 to pads 78 and second ends 82 to wires 38 may include readily available leaded or lead-free solders containing tin, lead, copper, silver, bismuth, indium, zinc, or other soldering materials well known in the art.

As illustrated in FIG. 3, slot 68 may have a width sufficient to accommodate thermal cutoffs 36 arranged side-by-side in slot 68. In one exemplary embodiment, the width of slot 68 may be substantially equal to a sum of diameters of thermal cutoffs 36. Thus, in the exemplary embodiment illustrated in FIG. 3, the width of the slot may be about four times the diameter of thermal cutoff 36. Although FIG. 3 illustrates only four thermal cutoffs 36, it is contemplated that memory module 30 may have any number of thermal cutoffs 36. Further, although FIG. 3 illustrates all four thermal cutoffs 36 disposed in one slot 68, it is contemplated that memory module 30 may have any number of slots 68 and each of those slots 68 may accommodate any number of thermal cutoffs 36 arranged side-by-side.

Figure 4:
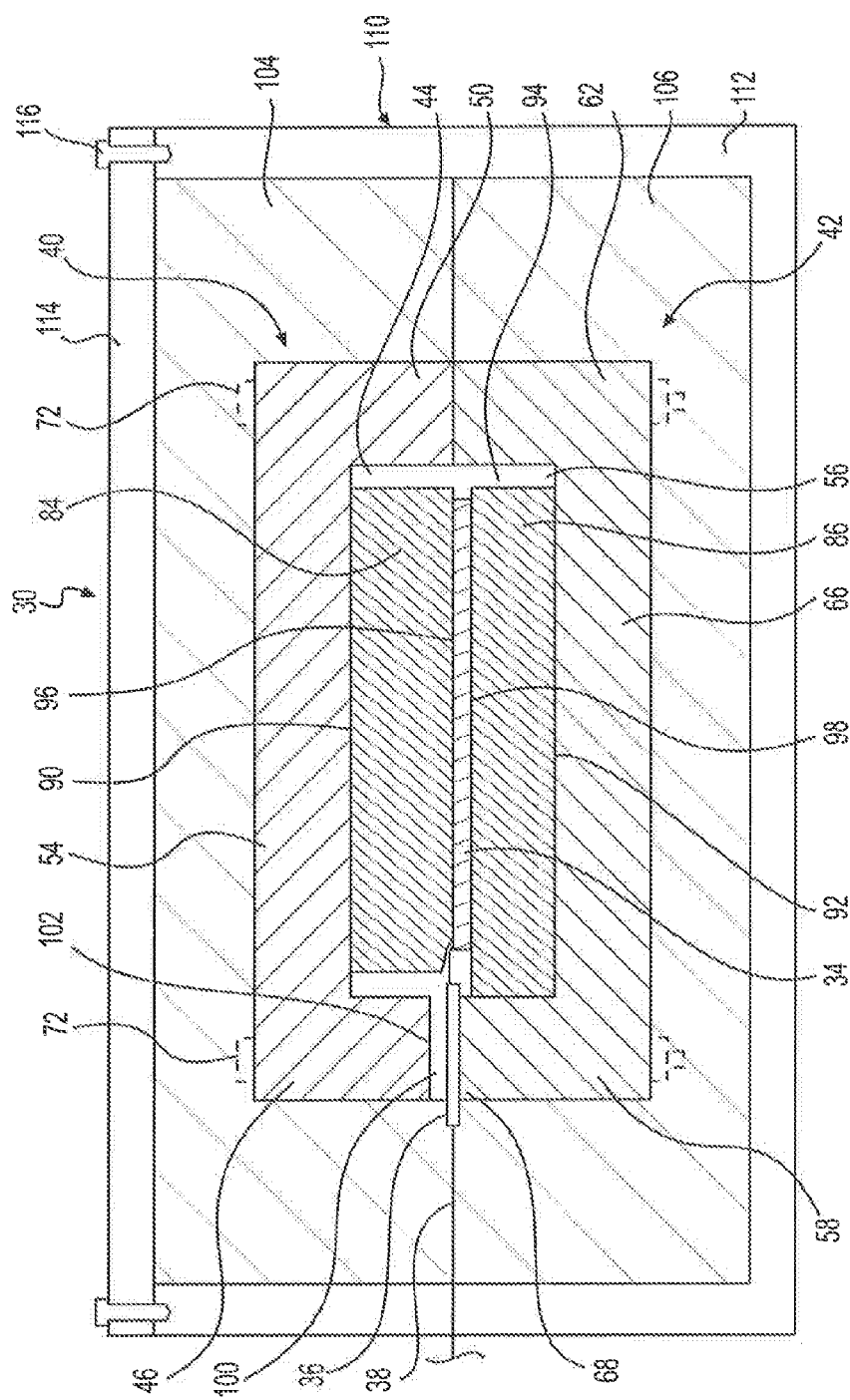
FIG. 4 is a diagrammatic cross-section of the exemplary disclosed memory module of FIG. 3.

FIG. 4 illustrates a diagrammatic view of a vertical cross-section of an exemplary disclosed memory module 30. As illustrated in FIG. 4, memory module 30 may include first filler portion 84 and second filler portion 86. First filler portion 84 may be disposed in upper recess 44 of top portion 40. It is contemplated that first filler portion 84 may have a surface, which may readily adhere to an inner surface 90 of top wall 54 of top portion 40. Second filler portion 86 may be disposed in lower recess 56 of bottom portion 42. It is contemplated that like first filler portion 84, second filler portion 86 may have a surface that may readily adhere to an inner surface 92 of bottom wall 66 of bottom portion 42. First filler portion 84 and second filler portion 86 may each have a rectangular, circular, polygonal or any other shape known in the art. First filler portion 84 and second filler portion 86 may be sized so as to leave a gap 94 with respect to one or more of side walls 46, 48, 50, 52, 58, 60, 62, 64. First filler portion 84 and second filler portion 86 may have a thickness about equal to or different from a depth of upper and lower recesses 44 and 56, respectively. First filler portion 84 may be disposed on first side 96 of device 34 and second filler portion 86 may be disposed on second side 98 of device 34 opposite first side 96. In one exemplary embodiment, first filler portion 84 and second filler portion 86 may be in contact with device 34. It is contemplated, however, that first filler portion 84 and second filler portion 86 may be disposed in upper recess 44 and lower recess 56, respectively, such that an air gap may be formed between first and second filler portions 84, 86 and first and second sides 96, 98, respectively, of device 34. In one exemplary embodiment, the air gap may have a thickness of about 5 to 10 mils. In another exemplary embodiment, first filler portion 84 and second filler portion 86 may be sized to occupy about 30% to 60% of upper recess 44 and lower recess 56, respectively. In yet another exemplary embodiment, first filler portion 84 and second filler portion 86 may be sized so that upon assembly, first filler portion 84, second filler portion 86, and device 34 may occupy about 50% to 80% of a combined volume of upper and lower recesses 44, 56. Although FIG. 4 illustrates first filler portion 84 separate from second filler portion 86, it is contemplated that first or second filler portion 84, 86 may be wrapped around device 34 as filler 84 or 86 so as to occupy both upper recess 44 and lower recess 56. It is also contemplated that device 34 wrapped with first or second filler portion 84, 86 may, for example, occupy about 50% to 80% of the combined volume of upper and lower recesses 44, 56.

First filler portion 84 and second filler portion 86 may be made of the same material or different materials. First filler portion 84 and second filler portion 86 may also have surfaces which may be tacky and may adhere to inner surfaces 90, 92 of top wall 54 and bottom wall 66, respectively. It is contemplated, however, that first and second filler portions 84, 86 may also adhere to one or more of side walls 46, 48, 50, 52, 58, 60, 62, 64 of enclosure 32. First and second filler portions 84, 86 may be sheets or strips of a thermally conductive filler material used to evenly distribute thermal energy that reaches the electronic components of the memory module. First filler portion 84 and second filler portion 86 may have a relatively lower thermal conductivity compared to a thermal conductivity of top portion 40 and bottom portion 42. In one exemplary embodiment, first and second filler portions 84, 86 may be made of thermal clay having a thermal conductivity of about 0.5 to 2 W/mK. In another exemplary embodiment, first and second filler portions 84, 86 may be made of a material having a thermal conductivity of about 1.6 W/mK. As further illustrated in FIG. 4, thermal cutoff 36 may be disposed in slot 68 of side wall 58. Slot 68 may have a depth that allows placement of thermal cutoffs 36 in slot 68 with a small gap 100 between thermal cutoffs 36 and a mating surface 102 of first side wall 46 of top portion 40.

As further illustrated in FIG. 4, memory module 30 may include a housing 110. Housing 110 may include upper insulator 104, lower insulator 106, housing base 112 and a lid 114. Enclosure 32 may be disposed between upper insulator 104 and lower insulator 106 in housing 110. Upper and lower insulators 104, 106 may be made of thermally insulating materials such as ceramic, fiberglass, plastic, polymer, Bakelite, microporous insulation such as silica or any other insulating materials known in the art. Lid 114 may be fixedly connected to housing base 112 via connectors 116. Connectors 116 may be screws, nuts, rivets, or any other type of connector known in the art. It is contemplated, however, that lid 114 may be fixedly connected to housing base 112 using adhesives, welding, brazing, or any other method known in the art. Housing 110 may have a cuboidal or cylindrical shape. It is contemplated that housing 110 may be an elliptical pyramid, polygonal pyramid, or may have any other shape known in the art. Housing 110 may be made of metal.

An exemplary operation and an exemplary method of manufacturing of memory module 30 with thermal cutoffs 36 will be described next.

INDUSTRIAL APPLICABILITY

The disclosed memory module with thermal cutoffs may be used in any machine or power system application where it is beneficial to safeguard the devices within the memory module from being damaged or destroyed by exposure to high temperatures. The disclosed memory module may find particular applicability with mobile machines such as locomotives when such machines are involved in an accident accompanied by a fire. The disclosed memory module may provide an improved method for protecting devices within the memory module from being damaged or destroyed by exposure to high temperatures caused by the fire. For example, the disclosed memory module may provide an improved method for disconnecting wires connected to devices or electronic components in the memory module to prevent heat generated by the fire from being conducted by the wires from outside the memory module to devices and electronic components within the memory module.

In particular, when machine 10 is involved in an accident resulting in a fire, memory module 30 may be subjected to high temperatures because of the fire. For example, memory module 30 may be subjected to temperatures as high as 1400° F. Wires 38 may conduct heat produced by the fire from outside enclosure 32 to pads 78 on device 34. Thermal cutoff 36 on each wire 38 may disconnect wire 38 from pad 78 when a temperature of thermal cutoff 36 exceeds a threshold temperature. Disconnecting wires 38 from pads 78 may prevent conduction of heat from outside enclosure 32 through wire 38 to device 34, thereby preventing damage or destruction of device 34 or of any data stored in storage devices 76 or in other electronic components associated with device 34. A method of manufacturing memory module 30 with thermal cutoffs 36 will now be described.

Figure 5:
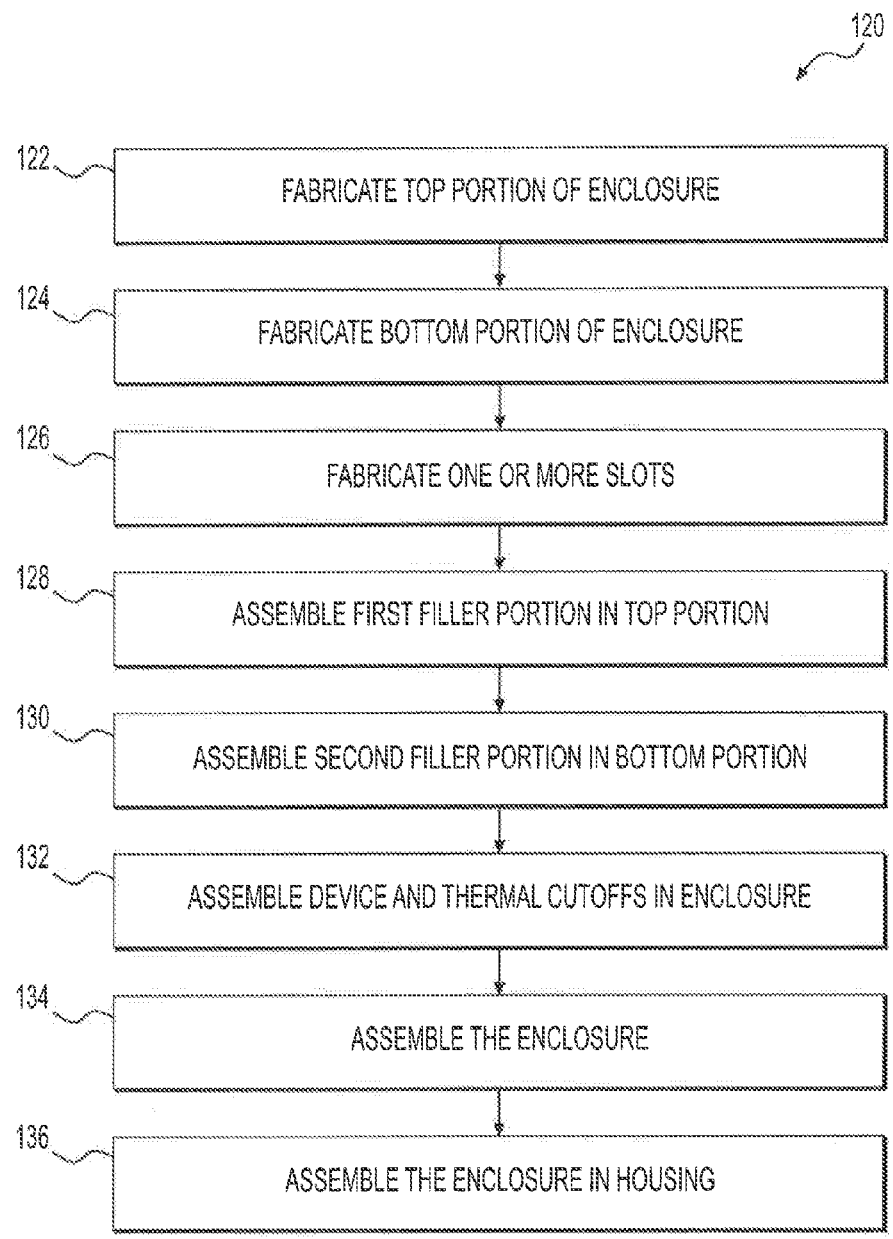
FIG. 5 is a flow chart illustrating an exemplary method of manufacturing the disclosed memory module of FIG. 3.

FIG. 5 illustrates an exemplary method 120, which may be performed for manufacturing memory module 30 with thermal cutoffs 36. Process 120 may include a step 122 of fabricating top portion 40 of enclosure 32. Fabricating top portion 40 may involve machining top portion 40 out of metal or any other material selected for the manufacture of enclosure 32. Fabricating top portion 40 may include machining upper recess 44 and holes 70 in top portion 40. Upper recess may be formed, for example, by milling, laser cutting, or any other material removal process known in the art. Holes 70 may be formed by processes such as mechanical drilling, laser drilling, threading, and/or any other process used for fabricating holes known in the art. It is also contemplated that top portion 40, including upper recess 44 and holes 70, may be fabricated using casting, injection molding, pressing, or any other forming process known in the art. Process 120 may include a step 124 of fabricating bottom portion 42 of enclosure 32. Fabricating bottom portion 42 may involve materials and processes similar to those disclosed above with respect to step 122.

Process 120 may include a step 126 of fabricating one or more slots 68. Slot 68 may be fabricated by machining slots 68 in one or more of side walls 46, 48, 50, 52, 58, 60, 62, 64, top wall 54, and/or bottom wall 66. Machining slots 68 may include processes such as mechanical drilling, laser drilling, milling, and/or any other process used for fabricating slots known in the art. In one exemplary embodiment, one or more slots 68 may be formed while forming top and/or bottom portion 40, 42 using casting, injection molding, metal forming, etc.

Process 120 may include a step 128 of assembling first filler portion 84 in top portion 40. Assembling first filler portion 84 may include cutting first filler portion 84 from a sheet of material to an appropriate size and placing first filler portion 84 in upper recess 44 so as to leave a gap 94 between first filler portion 84 and one or more of side walls 46, 48, 50, 52. In one exemplary embodiment, first filler portion 84 may be sized to occupy about 30% to 60% of a volume of upper recess 44.

Process 120 may include a step 130 of assembling second filler portion 86 in bottom portion 42 of enclosure 32. Assembling second filler portion 86 may include cutting second filler portion 86 from a sheet of material to an appropriate size and placing second filler portion 86 in lower recess 56 so as to leave a gap 94 between second filler portion 86 and one or more of side walls 58, 60, 62, 64. In one exemplary embodiment, second filler portion 86 may be sized to occupy about 30% to 60% of a volume of lower recess 56.

Process 120 may include a step 132 of assembling device 34 and thermal cutoffs 36 in enclosure 32. Assembling device 34 may include placing device 34 on first filler portion 84 or second filler portion 86 within enclosure 32. Assembling device 34 may further include placing thermal cutoffs 36 side-by-side in slot 68 so that the thermal cutoffs 36 occupy substantially an entire width of slot 68. Assembling device 34 may further include attaching first ends 80 of one or more thermal cutoffs 36 to one or more pads 78, respectively, of device 34. Attaching first ends 80 may include a process of soldering the one or more first ends 80 to pads 78 using soldering processes well-known in the art. It is contemplated that attaching first ends 80 may include a process of brazing, spot welding, ultrasonic welding, or any other process of attaching components to an electronic circuit known in the art. Assembling device 34 may further include attaching wires 38 to second ends 82 of thermal cutoffs 36. Attaching wires 38 to second ends 82 of thermal cutoffs 36 may include processes similar to those discussed with respect to attaching the first ends 80 of the thermal cutoffs 36 to pads 78.

Process 120 may include a step 134 of assembling enclosure 32. Assembling enclosure 32 may include placing top portion 40 with first filler portion 84 disposed in upper recess 44 on bottom portion 42 so that device 34 is sandwiched between first filler portion 84 and second filler portion 86. Assembling enclosure 32 may also include fixedly attaching top portion 40 and bottom portion 42 using connectors 72 inserted in holes 70. It is contemplated, however, that in some exemplary embodiments, top portion 40 and bottom portion 42 may be fixedly attached to each other using an adhesive or by, for example, welding or brazing the top and bottom portions 40, 42.

Process 120 may include a step 136 of assembling enclosure 32 in housing 110. Assembling enclosure 32 in housing 110 may include using an arbor press to push lower insulator 106 into housing base 112. Assembling enclosure 32 in housing 110 may also include placing enclosure 32 in a recess in lower insulator 106. Further, assembling enclosure 32 in housing 110 may include using an arbor press to push upper insulator 104 into housing base 112 so that upper insulator 104 covers enclosure 32. One skilled in the art would recognize that electrical, pneumatic, or hydraulic presses and/or clamps, etc. may be used to assemble upper insulator 104 and lower insulator 106 in housing base 112. Assembling enclosure 32 in housing 110 may also include attaching lid 114 to housing base 112 using connectors 116. It is contemplated, however, that in some exemplary embodiments, lid 114 and housing base 112 may be fixedly attached to each other using an adhesive or by, for example, welding or brazing lid 114 and housing base 112. In one exemplary embodiment, upper insulator 104 and lower insulator 106 may be held together by pressure applied by lid 118 and/or an interference fit between housing base 112 and upper and/or lower insulators 104, 106.

It will be apparent to those skilled in the art that various modifications and variations can be made to the disclosed memory module without departing from the scope of the disclosure. Other embodiments of the disclosed memory module will be apparent to those skilled in the art from consideration of the specification and practice of the disclosed memory module disclosed herein. It is intended that the specification and examples be considered as exemplary only, with a true scope of the disclosure being indicated by the following claims and their equivalents.

What is claimed is:

1. A memory module, comprising:
an enclosure including a wall that defines a slot therethrough;
an electronic device disposed within the enclosure;
a filler disposed within the enclosure, the filler including a first filler portion and a second filler portion, a surface of the first filler portion facing a surface of the second filler portion, the surface of the first filler portion and the surface of the second filler portion being in contact with the electronic device; and
a thermal cutoff disposed in the slot, the thermal cutoff including
a first end attached to the electronic device, and
a second end attached to a wire configured to electrically connect to the electronic device, the thermal cutoff being configured to disconnect the wire from the electronic device when subjected to a threshold temperature.

2. The memory module of claim 1, wherein the first end of the thermal cutoff is soldered to a pad on the electronic device.

3. The memory module of claim 1, wherein the enclosure includes
a top portion having an upper recess; and
a bottom portion configured to be fixedly attached to the top portion, the bottom portion having
a side wall defining the slot therethrough; and
a lower recess.

4. The memory module of claim 3, wherein
the first filler portion is disposed in the upper recess,
the second filler portion is disposed in the lower recess, and
the electronic device is disposed between the first filler portion and the second filler portion.

5. The memory module of claim 3, wherein the thermal cutoff is one thermal cutoff of a plurality of thermal cutoffs disposed in the slot.

6. The memory module of claim 5, wherein each thermal cutoff of the plurality of thermal cutoffs has a substantially cylindrical shape, and
all of the thermal cutoffs are disposed side-by-side in the slot, such that the thermal cutoffs are substantially perpendicular to the side wall.

7. The memory module of claim 5, wherein the slot has a width substantially equal to a sum of diameters of all of the thermal cutoffs.

8. The memory module of claim 1, wherein the threshold temperature ranges from about 110° C. to 125° C.

9. A thermal wiring disconnect system for an electronic device disposed within an enclosure, the thermal wiring disconnect system comprising:
a wall of the enclosure defining a slot therethrough;
a thermal cutoff disposed in the slot, the thermal cutoff including
a first end attached to the electronic device, and
a second end attached to a wire configured to electrically connect to the electronic device, the thermal cutoff being configured to disconnect the wire from the electronic device when subjected to a threshold temperature; and
a filler disposed within the enclosure, the filler including a first filler portion and a second filler portion, a surface of the first filler portion facing a surface of the second filler portion, the surface of the first filler portion and the surface of the second filler portion being in contact with the electronic device.

10. The thermal wiring disconnect system of claim 9, wherein the first end is soldered to a pad on the electronic device.

11. The thermal wiring disconnect system of claim 9, wherein the filler comprises a thermal clay.

12. The thermal wiring disconnect system of claim 9, wherein the threshold temperature ranges from about 230° F. to 260° F.

13. A method for manufacturing a memory module, the method comprising:
fabricating an enclosure including a wall that defines a slot therethrough;
installing a filler within the enclosure, the filler including a first filler portion and a second filler portion, a surface of the first filler portion facing a surface of the second filler portion;
installing an electronic device in the enclosure, the surface of the first filler portion and the surface of the second filler portion being in contact with the electronic device; and
installing a thermal cutoff by
disposing the thermal cutoff in the slot so that the thermal cutoff is substantially perpendicular to the wall;
connecting a first end of the thermal cutoff to the electronic device; and
connecting a second end of the thermal cutoff to a wire configured to electrically connect to the electronic device, wherein the thermal cutoff is configured to disconnect the wire from the electronic device when subjected to a threshold temperature.

14. The method of claim 13, further comprising:
soldering the first end of the thermal cutoff to the electronic device; and
soldering the second end of the thermal cutoff to the wire.

15. The method of claim 13, wherein the thermal cutoff is a first thermal cutoff, and the wire is a first wire, the method further comprising
placing a second thermal cutoff in the slot, the second thermal cutoff being arranged adjacent to and lengthwise parallel to the first thermal cutoff;
connecting a first end of the second thermal cutoff to the electronic device; and
connecting a second end of the second thermal cutoff to a second wire configured to electrically connect to the electronic device.

16. The method of claim 13, wherein the thermal cutoff is one thermal cutoff of a plurality of thermal cutoffs and the slot has a width substantially equal to a sum of diameters of all thermal cutoffs of the plurality of thermal cutoffs.

17. The method of claim 13, wherein fabricating the enclosure includes
fabricating a top portion of the enclosure, the top portion defining an upper recess; and
fabricating a bottom portion of the enclosure, the bottom portion defining a lower recess.

18. The method of claim 17, wherein the installing the filler within the enclosure includes placing the first filler portion in the upper recess, and placing the second filler portion in the lower recess,
the method further comprising fixedly connecting the top portion of the enclosure to the bottom portion of the enclosure.

* * * * *